Sept. 10, 1968          H. D. SULLIVAN          3,400,953
HYDRAULIC TUBING CONNECTOR WITH VIBRATION DAMPING MEANS
Filed June 27, 1966
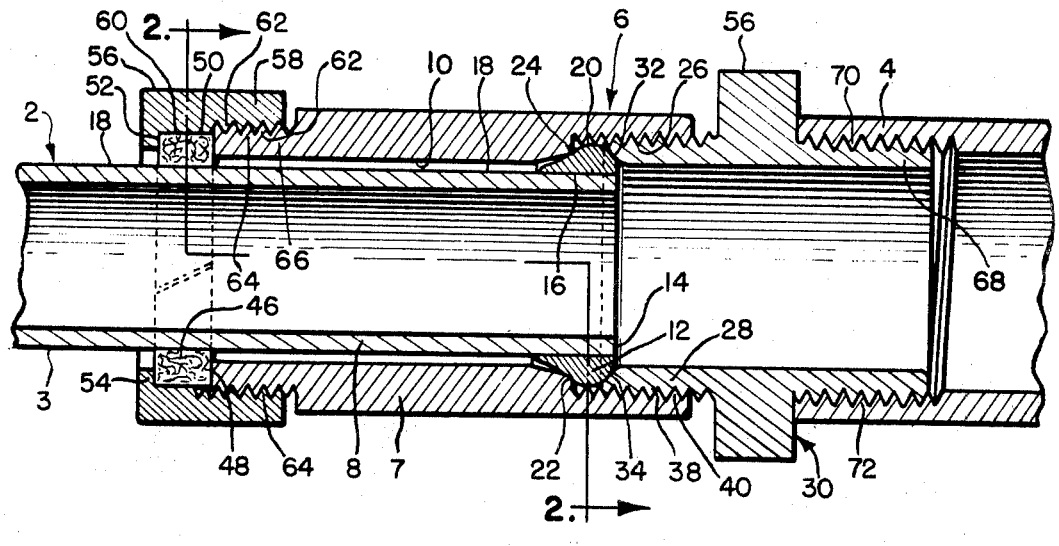
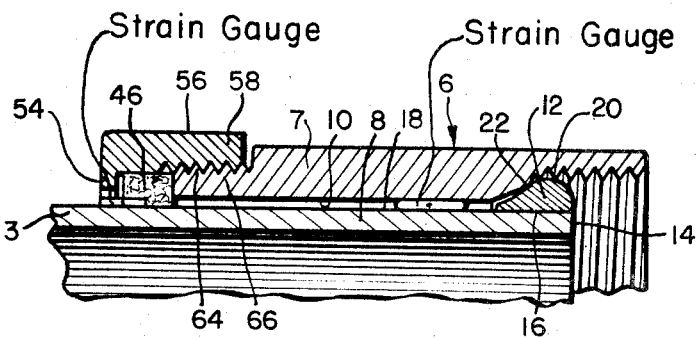
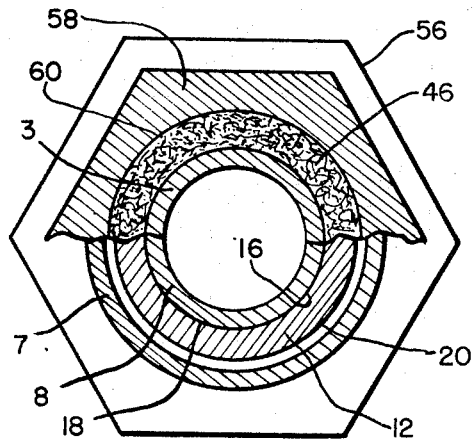
Inventor
Herbert D. Sullivan
By *John J. Kowalik*
Attorney

United States Patent Office 3,400,953
Patented Sept. 10, 1968

3,400,953
HYDRAULIC TUBING CONNECTOR WITH VIBRATION DAMPING MEANS
Herbert D. Sullivan, Hinsdale, Ill., assignor to International Harvester Company, Chicago, Ill., a corporation of Delaware
Filed June 27, 1966, Ser. No. 560,766
1 Claim. (Cl. 285—50)

ABSTRACT OF THE DISCLOSURE

A hydraulic tubing connection having a fluid carrying tube enclosed within a support tube, a connecting tube, a metal to metal sphero-conical seal connecting the fluid carrying tube to the connecting tube, and a resilient packing between the fluid carrying tube and the support tube spaced from the connection a distance equal to at least one and a half outside diameters of the fluid carrying tube.

---

This invention relates to a connector between several tube sections of a hydraulic line and/or between a tube section and another element of an hydraulic circuit.

A general object of the invention is to provide a novel, simple and effective connection for tubes or conduits of a hydraulic line or between a line and a component, such as a pump, which effects a good seal and wherein the parts are so arranged as to effectively minimize fatigue failures at the seal connection.

In hydraulic lines which are subjected to extremely high normal pressures, such as about 5,000 p.s.i. and wherein surge pressures may reach 8,000 p.s.i. or over, it has been found that resilient sealing connections are ineffective. The high pressures cause the tubing to act as cylinders if the seals hold and thus the tubing parts. Various attempts have been made to prevent such separation even to the extent of providing sharp points on the nut embracing the tubing at the connection so that the points dig into the tubing wall as the tubing is being forced out of the nut. However, under the high pressures encountered, even such structures fail since these points have been known to scarf out the tubing wall and the tubing separates anyway. Making the tubing of special hard steels defeats the purpose of the points since they cannot penetrate. The only alternative is to have a metal-to-metal seal by a spherical sealing ring integrated with the tube and clamped within complementary cones or by flared fittings. Further, these same high internal pressures necessitate the use of heavy wall tubing. Therein lies the problem with all known high pressure connectors. Given a rigid sealing joint and rigid tubing and add vibration to the tubing and an ideal condition prevails for fatigue failure at or near the terminal end of the tube.

The invention contemplates a novel, firm self-centering support extending from a pump, motor, or other component to which the hydraulic line is connected.

A more specific object of the invention is to provide a connection in a hydraulic circuit between components, such connection comprising a metal-to-metal contact between the connecting parts so as to effect a high pressure seal therebetween and wherein means are provided for preventing relative movements therebetween at the metal-to-metal areas and wherein a supplementary support is provided remote from the sealing area.

A more specific object of the invention is to provide novel connections as set forth which are subjected to vibrations, said connections comprising a sleeve member sleeved over the end of one tube which is provided with a sealing means at one end engaging a generally conical seat within the sleeve, the sleeve including a nut-type packing gland which is spaced axially from the sealing means such as a ring or flare, the packing gland serving to accommodate relative angular movement between the sleeve and the tube with a damping action of an elastomer ring interposed between the sleeve and the tube and the sleeve being connected and in effect forming part of the component to which the tube is connected.

A further object of the invention is to provide a connection between sections of hydraulic lines wherein the lines or sections of lines are accommodated angular displacement between and wherein the connection resiliently dampens relative movements between these parts.

These and other objects and advantages inherent in and encompassed by the invention will become more readily apparent from the specification and the drawings wherein:

FIGURE 1 is an axial sectional view of the novel connection;

FIGURE 2 is a transverse sectional view thereof taken substantially on line 2—2; and FIGURE 3 is a view similar to FIG. 1 illustrating the test procedure involved.

Describing the invention in detail and having particular reference to the drawing there is shown a conduit line generally designated 2 which includes a pair of axially spaced tube sections 3 and 4 which are arranged in end-to-end relationship and interconnected by the novel connector generally designated 6. The connector 6 includes a sleeve (or nut) 7 which is telescoped over the end portion 8 which extends through a bore 10. The tube 3 is provided with a spherical sealing ring 12 at the terminal edge 14, said spherical ring 12 having a cylindrical bore 16 which snugly fits over the periphery 18 of the tube 3 and is thereat either weld connected or sweated on and secured as by solder as well known to those skilled in the art. The ring 12 has a spherical outer surface or contour 20 which engages on its inner side as at 22 with a conical surface 24 which is formed within the tube 7 intermediate its ends at the inner extremity of an enlarged bore portion 26 at one end of the tube whereat there is admitted a sleeve or nipple portion 28 of a nipple generally designated 30. The nipple portion 28 at its inner end is provided with a conical internal edge 32 which engages the spherical surface 20 as at 34. The portion 28 of the nipple 30 is threaded as at 38 which inter threads with threads 40 on the interior of the enlarged bore portion 26 whereby upon the nipple portion 28 being threaded into the enlarged bore 26, the bearing surface 34 will engage the surface 20 as at 32 and will then urge the ring 12 into engagement as at 22 with the conical shoulder 24. Thus, it will be seen that a universal connection is developed between the sleeve 7 and the nut portion 30 and the pipe or tube 3 so that they do not have to be in true alignment.

The tube 8 has its periphery 18 spaced radially inwardly from the bore surface 10 and at an axially displaced area with respect to the ring 12 is engaged by a ring 46 of elastomer material. As well seen in FIGURE 1, the ring of elastomer material may be split diagonally with respect to the axis of the connection or the tube and at its inner edge 48 may engage the opposite or opposing edge 50 of the sleeve and at its outer edge 52 may engage an internal flange 54 of a nut 56, the nut 56 having an axial portion 58 which has an internal bore 60 threaded as at 62 which in turn is threaded on the thread 64 which is formed on the reduced end portion 66 of the sleeve 7. Thus, it will be seen that tightening of the nut 56 will compress and distort the sealing gland 46 thus will cause the material of the packing gland to flow radially inwardly and yieldably engage the periphery 18 of the tube or conduit 3. Thus, it will be seen that the conduit portion 3 is rigidly clamped through ring 12 to the shoulders 24, 34 and that flexing movement of the tube is yieldably controlled by the elastomeric ring 46. It will be noted that the coupling sleeve or nut 30 may be provided with an hexagonal wrench-engaging portion 56 intermediate its ends and that the outer end portion 68 of the member 30 may extend axially outwardly of the portion 56 and be externally threaded as at 70 in order to thread into complementary thread 72 on the interior of the conduit section 4. This section 4 may be part of a pump housing, motor, etc. Thus the nut 56 and sleeve 7 form in effect a rigid part of the structure 4 and the packing gland 46 provides an auxiliary support for tube 3.

Thus, a novel, simple, and effective connection has been provided which accommodates relative angular displacement between the sections of the conduit so that they need not be stressed into alignment and also the connection distributes vibration induced stresses over a length of tube such as reduces these stresses to a non-destructive level.

We have found from extensive tests that a critical relationship exists in the disposition of the elastic gland with respect to the spherical joint otherwise the connection quickly fatigues and fractures. It has been found that the span from the center of the rigid sealing joint to the center of the elastic gland must be at least one and one half diameters of the tube 3 being connected for effective vibration isolation. The following calculations are representative:

Material

Three fitting nuts 7 for spherical ferrule 1-inch tube fittings. (1) production 2 7/16" length, (2) special 1 7/8" length and (3) special 1 1/4" length.

Method

A 4-foot length of 1010 steel tubing 1-inch O.D. with .109 inch wall was attached to a standard port fitting installed in a solid base. The tube was positioned horizontally and loaded on the end with a fixed weight (cantilever beam). Stress in the tube was calculated from strain measurements at the ferrule and at the outer end of the nut. Duplicate measurements were made for each of 3 nuts.

Results

Comparative tube stress at the ferrule for a given moment on the tube:

|  | P.s.i. |
|---|---|
| Production nut (2 7/16") | 4,620 |
| Special nut (1 7/8") | 6,900 |
| Special nut (1 1/4") | 13,200 |

Comparative tube stress at the outer end of the nut (same conditions as above):

|  | P.s.i. |
|---|---|
| Production nut (2 7/16") | 8,370 |
| Special nut (1 7/8") |  |
| Special nut (1 1/4") | 12,450 |

The indication is that a still longer nut would result in further decrease in stress at the ferrule. Nut length however cannot be increased appreciably beyond the present length because of space limitations on the tube.

Although a spherical connection is shown, a flare or any other metal-to-metal rigid connection is anticipated as within the scope of the present disclosure.

Having described a preferred form of the invention, it will be realized that other embodiments will become readily apparent to those skilled in the art within the scope of the appended claim.

What is claimed is:

1. A high pressure coupling between a hydraulic component subject to vibration having a metal conduit rigidly connected thereto, the combination comprising a fluid carrying metal tube, a sleeve rigidly attached to said conduit at one end, a substantially conical terminal face on said sleeve opposing a similarly but oppositely sloped terminal end on said conduit, said sleeve encompassing the terminal end of said tube in spaced relation thereto about its entire periphery, an enlargement rigidly formed on the outer periphery of the terminal end of said tube and having sloping faces thereon complementary to said opposing faces of the sleeve and conduit and rigidly held thereby in fluid-tight adjusted position, adjustable clamping means on the opposite end of said sleeve, a gasket of resilient material disposed about the outer periphery of the tube and held between said clamping means and an end face of the sleeve at said opposite end thereof in cushioning relation between the tube and sleeve whereby to absorb vibration shocks imposed on the coupling and thereby reduce the loads on the coupling to an acceptable level, said gasket being spaced from the enlargement between the center lines thereof a distance equal to one and one half to two outer diameters of said tube.

References Cited

UNITED STATES PATENTS

| 1,942,213 | 1/1934 | Howard. | |
| 3,264,014 | 8/1966 | Brown. | |
| 2,422,597 | 6/1947 | Stewart | 285—116 |
| 2,677,557 | 5/1954 | Worel | 285—15 |

FOREIGN PATENTS

| 217,256 | 9/1961 | Austria. |
| 63,357 | 6/1949 | Netherlands. |
| 292,513 | 8/1953 | Switzerland. |

CARL W. TOMLIN, *Primary Examiner.*

DAVE W. AROLA, *Assistant Examiner.*